United States Patent [19]

Tobisawa et al.

[11] Patent Number: 5,449,527
[45] Date of Patent: Sep. 12, 1995

[54] METHOD OF PRODUCING MAGNETIC RECORDING MEDIUM

[75] Inventors: Seiichi Tobisawa; Ryosuke Isobe; Kunitsuna Sasaki, all of Hino, Japan

[73] Assignee: Konica Corporation, Japan

[21] Appl. No.: 186,979

[22] Filed: Jan. 26, 1994

[30] Foreign Application Priority Data

Feb. 2, 1993 [JP] Japan .................................. 5-015506

[51] Int. Cl.⁶ .............................................. H01F 10/02
[52] U.S. Cl. ..................................... 427/130; 427/128; 427/132; 427/385.5
[58] Field of Search ................... 427/127–132, 427/385.5

[56] References Cited

U.S. PATENT DOCUMENTS 5,061,516 10/1991 Isobe et al. ..................... 427/132

Primary Examiner—Bernard Pianalto
Attorney, Agent, or Firm—Jordan B. Bierman; Bierman and Muserlian

[57] ABSTRACT

Disclosed is a method of producing a magnetic recording medium which comprises a magnetic layer, comprising a step of kneading a magnetic coating solution containing a ferromagnetic powder and a binder for the magnetic layer under a load of substantial electric power consumption of 0.05 to 0.5 KW per Kg of the ferromagnetic powder in a kneader chamber having an atmospheric water content of not more than 1 g/m³.

16 Claims, 3 Drawing Sheets

METHOD OF PRODUCING MAGNETIC RECORDING MEDIUM

FIELD OF THE INVENTION

The present invention relates to a method of producing a magnetic recording medium, more specifically kneading of a magnetic coating solution.

BACKGROUND OF THE INVENTION

Japanese Patent Publication Open to Public Inspection (hereinafter referred to as Japanese Patent O.P.I. Publication) No. 58-200423 (U.S. Pat. No. 4,511,484) discloses kneading of a magnetic coating solution compound incorporating a magnetic metal powder in which heat generation from the metal powder is suppressed by keeping the kneading atmosphere oxygen concentration at not more than 11%, preferably at not more than 7%, specifically at 2% by $N_2$ gas purge.

U.S. Pat. No. 5,061,516 discloses prevention of ferromagnetic metal powder oxidation by lowering the oxygen concentration to not more than 5%.

Although it is possible to avoid the danger from firing of metal powder and prevent the deterioration of electromagnetic transferring property due to oxidation by lowering the oxygen concentration below 5%, it results in seasonal variation in kneading results and hence in electromagnetic transferring property, necessitating a means of stabilizing the state of kneading.

SUMMARY OF THE INVENTION

The object of the present invention is to improve and stabilize the state of kneading of a magnetic coating solution and to improve the electromagnetic transferring property.

The above object of the present invention is accomplished by a method of producing a magnetic recording medium having a magnetic layer containing a ferromagnetic powder and a binder, wherein the magnetic coating solution used in the magnetic layer is kneaded under a load of actual power consumption of 0.05 to 0.5 KW (per kg of ferromagnetic powder) in a kneader chamber atmosphere having a water content of not more than 1 g/m$^3$.

DETAILED DESCRIPTION OF THE INVENTION

In the present invention, various methods can be used to reduce the water content of the kneading atmosphere to not more than 1 g/m$^3$, but $N_2$ gas purge is the industrially easy and inexpensive method.

Figure 1:
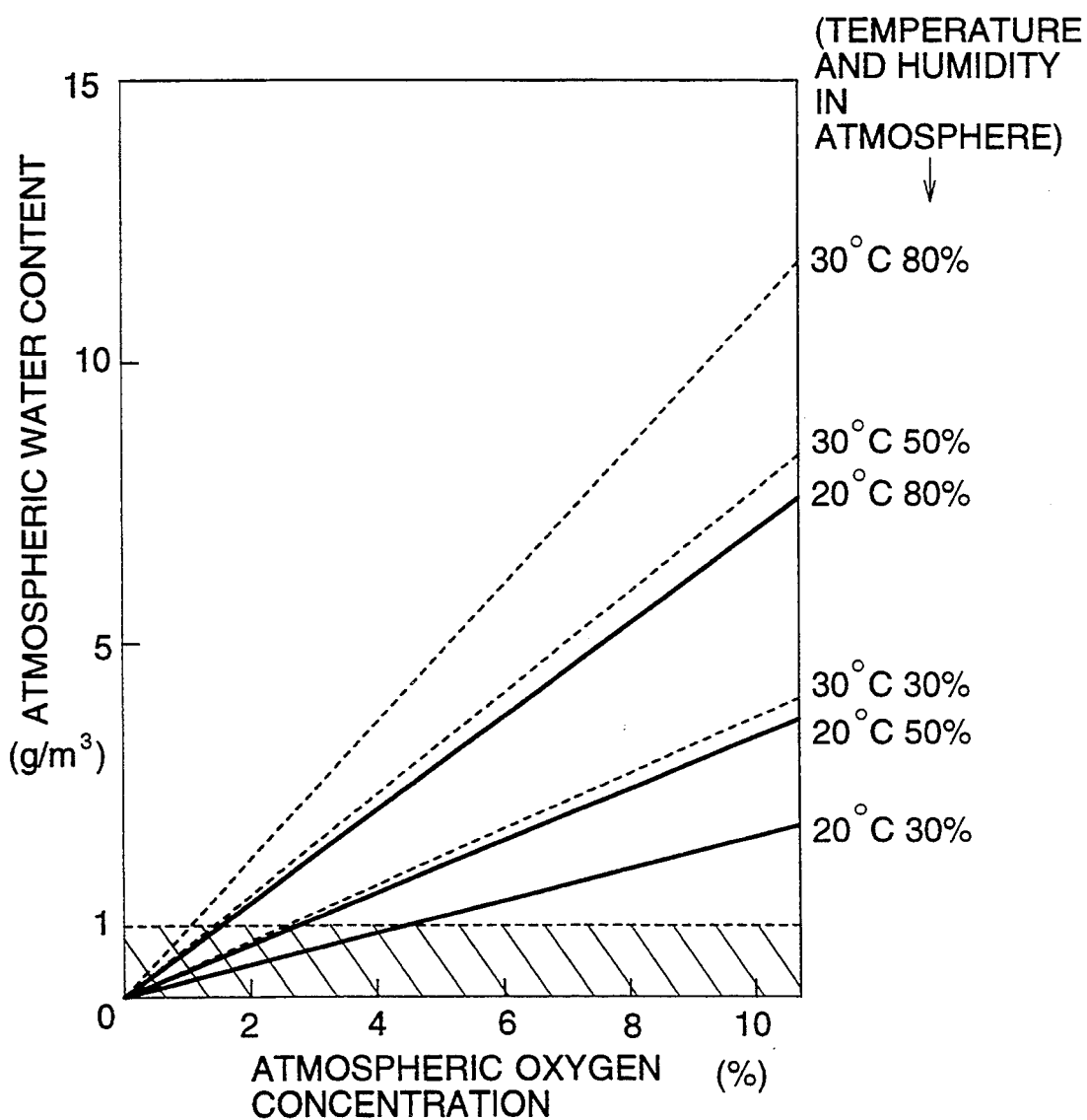
FIG. 1 is a graph showing the relationship between atmospheric water content and oxygen concentration in a kneading chamber.

For example, when an $N_2$ gas having a dew point of $-72°$ C. (water content 2 mg/m$^3$) is used, the atmosphere's water content can be lowered to not more than 1 g/m$^3$ because both the $O_2$ concentration in the atmosphere and the water content decline as the $N_2$ substitution rate increases, as shown in FIG. 1.

Determination of water content

The water vapor mass in an atmosphere can be calculated from the relative and absolute humidities at a given temperature. Also, the water content of an $N_2$ gas depends on its dew point. Thus, the water content in an atmosphere of a given $O_2$ concentration under given temperature/humidity conditions is shown by the graph of FIG. 1 of the present specification.

The magnetic coating solution used in the present invention is subjected to a kneading process in which a mixture of a ferromagnetic powder, a binder, a dispersing agent, a lubricant, an abrasive, an antistatic agent, etc. is kneaded and dispersed in a solvent. Kneading machines capable of providing a power consumption load of 0.05 to 0.5 KW (per kg of magnetic powder) include the compression kneader, oven kneader, continuous kneader, double-roll mill and triple-roll mill.

The above-described mixture composition can be sufficiently kneaded when the electric power consumption load is 0.05 to 0.5 KW (per kg of magnetic powder). This power consumption is the driving electric power supplied to the above-described kneading machine. Power consumptions of less than 0.05 KW are insufficient to offer satisfactory kneading. Power consumptions exceeding 0.5 KW result in uneven kneading and the tendency for electric power consumption to increase. This electric power consumption is preferably 0.1 to 0.5 KW, more preferably 0.2 to 0.5 KW.

Reversely, when the overall dispersibility of various fillers, including magnetic powder, in the binder, is high, the filler grains bind thoroughly to the binder, resulting in increased overall resistance to kneading deformation, which in turn leads to a higher level of power consumption for kneading.

FIG. 2(a) shows the relationship between the water content (g/m$^3$) in the kneading chamber atmosphere and a representative value of the substantial electric power consumption (KW) in a nearly equilibrated state at 20 minutes following kneading initiation.

As is evident from FIG. 2(a), power consumption tends to decrease when the water content exceeds 1.0 g/m$^3$.

It is also seen that gloss (FIG. 2(b) and RF output (both increase as the state of dispersion improves) decreased, demonstrating improvement in the kneading effect by water content restriction.

Figure 3:
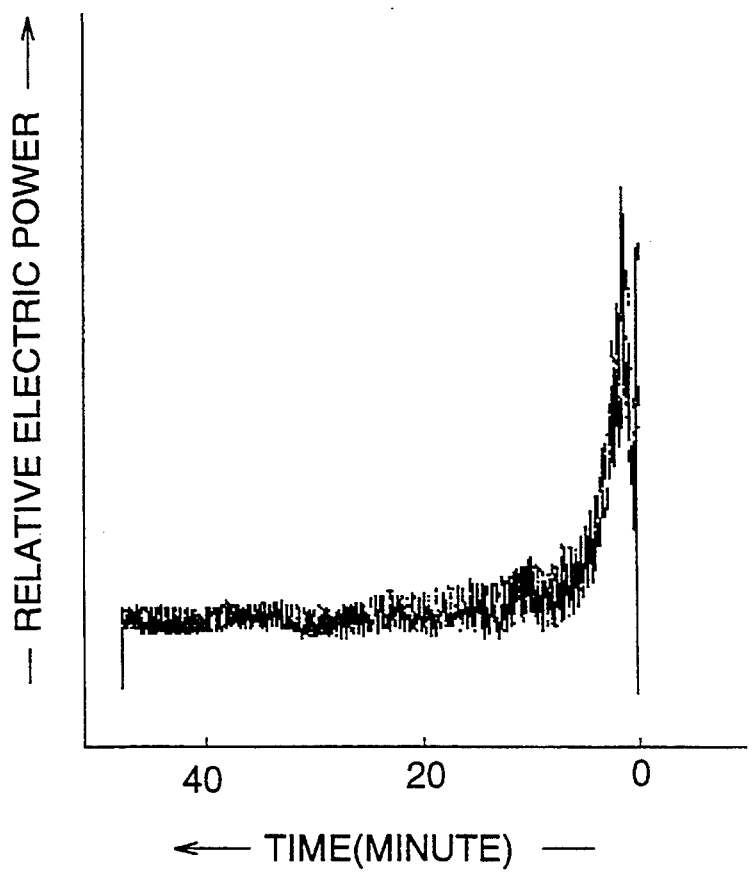
FIG. 3 shows changes in actual power consumption in the kneading process.

As shown in FIG. 3, substantial electric power consumption during kneading reaches a peak in the initial stage, followed by a decline with the progress of kneading, finally reaching a plateau according to each set of condition.

The height of this plateau serves as an index of the state of kneading.

In the above-described kneading process, kneading may be conducted in a number of stages.

For example, in the first kneading process, 100 parts by weight of a ferromagnetic powder, 3 to 15 parts by weight of polyurethane and/or polyester and 10 to 60 parts by weight of a solvent are kneaded for preferably 5 to 120 minutes. This allows thorough kneading of a ferromagnetic metal powder and polyurethane and/or polyester, which are difficult to disperse by any ordinary method, and hence allows good dispersion of the magnetic powder in a binder. In this case, dispersion is further facilitated, provided that the binder has a polar radical.

For good dispersion of a magnetic powder, the amount of binder is preferably 3 to 20 parts by weight, more preferably 6 to 18 parts by weight, and still more preferably 9 to 16 parts by weight. For good kneading, the amount of solvent is preferably 10 to 60 parts by weight, more preferably 20 to 55 parts by weight, and still more preferably 30 to 50 parts by weight.

In the present invention, a dispersing agent (aid) may be added before or during the kneading process.

Any ferromagnetic powder in common use for magnetic recording media can be used for the present invention. Examples of ferromagnetic powder include magnetic oxides such as $\gamma\text{-}Fe_2O_3$, Co-containing $\gamma\text{-}Fe_2O_3$, Co-adhered $\gamma\text{-}Fe_2O_3$, $Fe_3O_4$, Co-containing $Fe_3O_4$, Co-adhering $Fe_3O_4$, Co-containing magnetic $FeOx(3/2>x>4/3)$ and $CrO_2$. Hexagonal ferrites such as barium ferrite, and iron nitride can also be used.

Examples of ferromagnetic metal powder include ferromagnetic powders such as magnetic metal powders having Fe, Ni or Co element as main component. Fe metal powders are particularly excellent in electric properties, with preference given to Fe alloy powders such as Fe—Al alloy powder and Fe—Ni alloy powder from the viewpoint of corrosion resistance and dispersibility.

In the present invention, it is preferable to use a ferromagnetic powder having a specific surface area of not less than 45 $m^2/g$, as determined by the BET method, according to recording density. The bet method is disclosed in U.S. Pat. No. 4,992,330.

The preferable binders for the present invention are polyurethane, polyester and vinyl chloride resin. These resins preferably contain a repeat unit having at least one polar group selected from the group consisting of —$SO_3M'$, —$OSO_3M'$, —COOM' and —PO(OM")$_2$ (M" represents a hydrogen atom or an atom of an alkali metal such as Na, K or Li; M' represents a hydrogen atom, an atom of an alkali metal such as Na, K or Li, or an alkyl group.

The above-described polar radical acts to improve the dispersion of a magnetic powder, its content being 0.1 to 8.0 mol % (preferably 0.5 to 6.0 mol %). Polar radical contents of lower than 0.1 mol % result in decreased dispersibility. Polar radical contents exceeding 8.0 mol % result in the tendency for the magnetic coating solution to gel. The weight-average molecular weight is preferably 15,000 to 50,000.

In addition to the above resins, other resins can be used at not lower than 20% by weight of the total binder content.

Such other resins include, but having a weight-average molecular weight of 10,000 to 200,000, vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral, cellulose derivatives (nitrocellulose etc.), styrene-butadiene copolymer, various synthetic rubber resins, phenolic resin, epoxy resin, urea resin, melamine resin, phenoxy resin, silicone resin, acrylic resin and urea formamide resin.

To improve the durability of the magnetic layer of the present invention, it is preferable to add polyisocyanate. Examples of usable aromatic polyisocyanates include active hydrogen compound adducts of tolylene diisocyanate (TDI) etc. Examples of usable aliphatic polyisocyanates include active hydrogen compound adducts of hexamethylene diisocyanate (HMDI) etc. The weight-average molecular weight of the polyisocyanate is preferably 100 to 3,000.

In forming the above-described magnetic layer, a dispersing agent, a lubricant, an abrasive, an antistatic agent, a filler and other additives may be added.

Dispersing agents which can be used for this purpose include fatty acids having 12 to 18 carbon atoms such as caprylic acid, captic acid, lauric acid, myristic acid, palmitic acid, stearic acid and oleic acid, and alkali metal salts or alkaline earth metal salts or amides thereof, polyalkylene oxide alkylphosphates, lecithin, trialkyl polyolefin oxy-quaternary ammonium salts, and azo compounds having the carboxyl group and sulfonate group. These dispersing agents are preferably added at 0.5 to 5% by weight of the ferromagnetic powder.

Fatty acid and/or fatty acid ester may be incorporated as a lubricant.

In this case, the amount of fatty acid added is preferably 0.2 to 10% by weight, more preferably 0.5 to 5% by weight of the ferromagnetic powder. Fatty acid contents below this range result in the tendency for the running property to decline. Fatty acid contents above this range result in fatty acid oozing out and the tendency for output to decline. To enhance the above effect, the weight ratio of the fatty acid and fatty acid ester is preferably 10:90 to 90:10.

Examples of abrasives include $\alpha$-alumina, fused alumina, chromium oxide, titanium oxide, $\alpha$-iron oxide, silicon oxide, silicon nitride, molybdenum carbide, tungsten carbide, boron carbide, corundum, zinc oxide, cerium oxide, magnesium oxide and boron nitride. The average grain size of the abrasive is preferably 0.05 to 0.6 $\mu m$, more preferably 0.1 to 0.3 $\mu m$.

Examples of antistatic agents include electro-conductive powders such as carbon black and graphite; cationic surfactants such as quaternary amine; anionic surfactants containing an acid group such as the sulfonic acid group, sulfuric acid group, phosphoric acid group, phosphate group or carboxylic acid group; amphoteric surfactants such as aminosulfonic acid; and natural surfactants such as saponin.

Preferably, the antistatic agent is added at 0.01 to 40% by weight of the binder.

Examples of the solvent added to the coating compound for the above magnetic layer include ketones such as acetone, methyl ethyl ketone (MEK), methyl isobutyl ketone (MIBK) and cyclohexanone, aromatic hydrocarbons such as benzene, toluene and xylene, alcohols such as methanol, ethanol, propanol and butanol, esters such as methyl acetate, ethyl acetate and butyl acetate, cyclic ethers such as tetrahydrofuran, and halogenated hydrocarbons such as methylene chloride, ethylene chloride, carbon tetrachloride, chloroform and dichlorobenzene.

Examples of nonmagnetic supports for the present invention include polyesters such as polyethylene terephthalate and polyethylene-2,6-naphthalate, polyolefins such as polypropylene, cellulose derivatives such as cellulose diacetate and cellulose triacetate, polycarbonate and polyamide.

The magnetic recording medium of the present invention comprises a nonmagnetic support such as polyethylene terephthalate and a magnetic layer 2 formed thereon, and where necessary a back coating layer (BC layer) formed on the face opposite to the magnetic layer. An overcoating layer (OC layer) may be formed on the magnetic layer. Also, a subbing layer (UC layer) may be formed between the magnetic layer and the support. Nonmagnetic support 1 may be subjected to a corona discharge treatment.

Coating methods for forming the above-described magnetic layer on a nonmagnetic support include air doctor coating, air knife coating, blade coating, squeeze coating, impregnation coating, transfer coating, reverse roll coating, kiss coating, gravure coating, cast coating and spray coating.

The magnetic layer coated on the nonmagnetic support is dried while undergoing magnetic field orientation, followed by surface smoothing by calendering. Then a varnish treatment or blade treatment is conducted before slitting as necessary.

The present invention is applicable to magnetic discs etc., as well as magnetic tapes.

EXAMPLES

The present invention is hereinafter described in more detail by means of the following example.

In the example below, the components, composition, order of procedures, etc. are variable, as long as the change does not deviate from the scope of the present invention.

Example 1

| | |
|---|---|
| Fe—Al ferromagnetic metal powder (average grain size 140 Å, Hc = 1750 Oe, BET value = 57 m$^2$/g) | 100 parts by weight |
| Polyurethane resin containing sodium sulfonate | 5 parts by weight |
| Polyvinyl chloride resin containing sodium sulfonate | 10 parts by weight |
| Cyclohexanone | 10 parts by weight |
| Methyl ethyl ketone | 10 parts by weight |
| Toluene | 10 parts by weight |

The above composition was kneaded in a compression kneader for 20 minutes under the conditions shown in Table 1.

The resulting kneaded product was then transferred to a ball mill and dispersed in the presence of the following materials for 24 hours.

| | |
|---|---|
| Kneaded product | 145 parts by weight |
| α-alumina | 5 parts by weight |
| Stearic acid | 1 part by weight |
| Butyl stearate | 1 part by weight |
| Cyclohexanone | 80 parts by weight |
| Methyl ethyl ketone | 80 parts by weight |
| Toluene | 80 parts by weight |

The magnetic coating solution thus obtained was filtered through a 0.5 μm filter, and 5 parts by weight of a polyisocyanate compound (Coronate L, Nippon Polyurethane) was added. This mixture was coated on a nonmagnetic support, oriented (4000 Gauss magnet used), dried and supercalendered, to yield a magnetic layer of 2.5 μm dry thickness. Then, the following back coating compound was placed in a ball mill and kneaded and dispersed for 70 hours, after which it was filtered through a 1 μm filter, and 20 parts by weight of a polyisocyanate compound (Coronate L, Nippon Polyurethane) was added. This mixture was coated on the support's face opposite to the magnetic layer. The bulk strip thus obtained was cut into an 8 mm video tape.

| Back coating layer coating compound | |
|---|---|
| Carbon black A (average grain size 30 nm) | 70 parts by weight |
| Carbon black B (average grain size 60 nm) | 30 parts by weight |
| Nitrocellulose | 30 parts by weight |
| Polyurethane resin | 30 parts by weight |
| Cyclohexanone | 200 parts by weight |
| Methyl ethyl ketone | 200 parts by weight |
| Toluene | 200 parts by weight |

Figure 2:
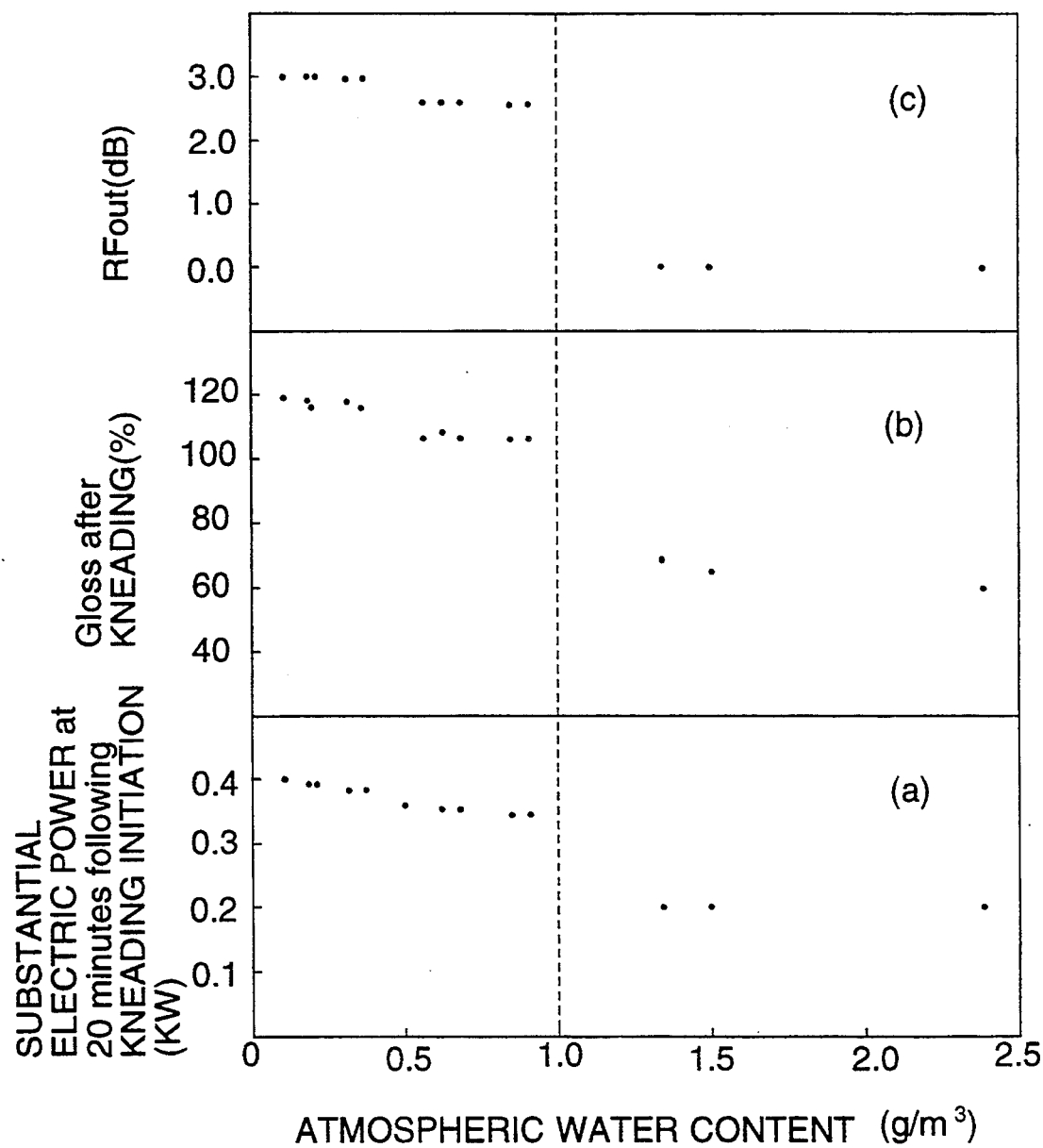
FIG. 2 shows the relationship between atmospheric water content and kneading power consumption, gloss after kneading and RF output.

Characteristic values at each step of this example are shown in Table 1 and FIG. 2.

Substantial electric power consumption at 20 minutes following kneading initiation: The values obtained after 20 minutes are given to represent the kneading characteristic. The degree of kneading increases as this value increases.

Gloss after kneading: The draw-down gloss values of the magnetic coating solution upon completion of kneading are given. The degree of kneading increases as this value increases.

RFout: RF output values, obtained using an 8 mm video deck, are given relative to the value obtained at level 13 taken as 0 dB.

From Table 1 and FIG. 2, it is seen that the state of kneading and electromagnetic transferring property are good when the atmosphere's water content is not more than 1 g/m$^3$.

In other words, such good properties can be stably achieved, even under any temperature/humidity conditions, by lowering the atmosphere's water content to not more than 1 g/m$^3$ by lowering the O$_2$ concentration at 0.5% or lower by purging an N$_2$ gas having a dew point of −72° C.

TABLE 1

| Example | Temperature (°C.) | Humidity (%) | O$_2$ concentration (%) | N$_2$-substitution rate (%) | Atmospheric water content (g/m$^3$) | Substantial electric power 20 minutes following kneading initiation (KW) | Gloss after kneading (%) | RFout (dB) |
|---|---|---|---|---|---|---|---|---|
| 1 | 20 | 30 | 2.0 | 90.5 | 0.507 | 0.35 | 103 | 2.6 |
| 2 | 20 | 30 | 0.5 | 97.6 | 0.128 | 0.40 | 119 | 3.1 |
| 3 | 20 | 50 | 2.0 | 90.5 | 0.844 | 0.33 | 101 | 2.5 |
| 4 | 50 | 50 | 0.5 | 97.6 | 0.213 | 0.39 | 118 | 3.1 |
| 5 | 20 | 80 | 2.0 | 90.5 | 1.350 | 0.20 | 48 | 0.1 |
| 6 | 20 | 80 | 1.5 | 92.9 | 1.013 | 0.21 | 56 | 0.1 |
| 7 | 20 | 80 | 1.0 | 95.2 | 0.676 | 0.34 | 103 | 2.6 |
| 8 | 20 | 80 | 0.5 | 97.6 | 0.339 | 0.38 | 117 | 3.0 |
| 9 | 30 | 30 | 2.0 | 90.5 | 0.906 | 0.33 | 100 | 2.5 |
| 10 | 30 | 30 | 0.5 | 97.6 | 0.228 | 0.39 | 117 | 3.1 |
| 11 | 30 | 50 | 2.0 | 90.5 | 1.509 | 0.20 | 45 | 0.1 |
| 12 | 30 | 50 | 0.5 | 97.6 | 0.379 | 0.38 | 116 | 3.0 |
| 13 | 30 | 80 | 2.0 | 90.5 | 2.414 | 0.19 | 40 | 0.0 |

TABLE 1-continued

| Example | Temperature (°C.) | Humidity (%) | O₂ concentration (%) | N₂-substitution rate (%) | Atmospheric water content (g/m³) | Substantial electric power 20 minutes following kneading initiation (KW) | Gloss after kneading (%) | RFout (dB) |
| --- | --- | --- | --- | --- | --- | --- | --- | --- |
| 14 | 30 | 80 | 0.5 | 97.6 | 0.605 | 0.34 | 104 | 2.6 |

According to the present invention, a sufficient and stable state of kneading can be achieved by lowering the atmosphere's water content to not more than 1 g/m³ in the magnetic coating solution kneading chamber.

What is claimed is:

1. A method of producing a magnetic recording medium including a support and a magnetic layer thereon, said method comprising kneading a magnetic coating solution containing a solvent, a ferromagnetic powder, and a binder for said magnetic layer under an electric power consumption load of 0.05 to 0.5 kw per kg of said ferromagnetic powder in a kneader chamber having an atmospheric water content not exceeding 1 g/m³ to form a magnetic mix, applying said mix to said support, and drying said mix.

2. The method of claim 1 wherein nitrogen gas is introduced into said chamber during said kneading.

3. The method of claim 2 wherein said nitrogen gas has a dew point of $-72°$ C. and a water content of 2 mg/m³.

4. The method of claim 1 wherein said power load is 0.1 to 0.5 kw per kg of said ferromagnetic powder.

5. The method of claim 1 wherein said binder is present in a binder amount, per 100 parts by weight of said ferromagnetic powder, of 3 to 20 parts by weight.

6. The method of claim 5 wherein said binder amount is 6 to 18 parts by weight.

7. The method of claim 6 wherein said binder amount is 9 to 16 parts by weight.

8. The method of claim 7 wherein said power load is 0.2 to 0.5 kw per kg of said ferromagnetic powder.

9. The method of claim 1 wherein said solvent is present in a solvent amount, per 100 parts by weight of said ferromagnetic powder, of 10 to 60 parts by weight.

10. The method of claim 9 wherein said solvent amount is 20 to 55 parts by weight.

11. The method of claim 10 wherein said solvent amount is 30 to 50 parts by weight.

12. The method of claim 1 wherein said ferromagnetic powder has Fe, Ni, Co, or mixtures thereof as a principal component.

13. The method of claim 12 wherein said ferromagnetic powder is an Fe—Al alloy, an Fe—Ni alloy, or a mixture thereof.

14. The method of claim 1 wherein said ferromagnetic powder has a BET specific surface area of at least 45 m²/g.

15. The method of claim 1 wherein said binder is a resin selected from the group consisting of polyethylene, polyesters, and vinyl chlorides.

16. The method of claim 15 wherein said binder contains a repeating unit having at least one polar group selected from the group consisting of —SO₃M', —O-SO₃M', —COOM' and —PO(OM")₂, wherein M" represents hydrogen or an alkali metal, M' represents hydrogen, an alkali metal, or an alkyl group.

* * * * *